Aug. 17, 1937.    J. P. WARD    2,090,586
APPARATUS FOR BODYING TUNG OIL
Filed July 2, 1934    9 Sheets-Sheet 1

Fig. 1

Inventor
Julian P. Ward
Hull Brockwest
By    Attorney

Aug. 17, 1937.           J. P. WARD           2,090,586
APPARATUS FOR BODYING TUNG OIL
Filed July 2, 1934            9 Sheets-Sheet 4

Aug. 17, 1937. J. P. WARD 2,090,586
APPARATUS FOR BODYING TUNG OIL
Filed July 2, 1934 9 Sheets-Sheet 6

Inventor
Julian P. Ward
By Hull Brock & West
Attorney

Aug. 17, 1937.   J. P. WARD   2,090,586
APPARATUS FOR BODYING TUNG OIL
Filed July 2, 1934   9 Sheets-Sheet 8

Patented Aug. 17, 1937

2,090,586

UNITED STATES PATENT OFFICE 2,090,586

APPARATUS FOR BODYING TUNG OIL

Julian P. Ward, Cleveland, Ohio; Frank Pelton, administrator of Julian P. Ward, deceased, assignor to The General Coating Company, Cleveland, Ohio, a corporation of Ohio Application July 2, 1934, Serial No. 733,355

9 Claims. (Cl. 87—12)

This invention relates to the treatment of tung oil or Chinese wood oil for the purpose of producing in liquid form an oil body suitable for forming protective and ornamental coatings for various surfaces and for rendering said material impervious to the passage of gases and liquids therethrough.

I am aware that prior to my invention others have recognized the suitability of treated tung oil for these purposes and accordingly I do not claim broadly the treatment of this oil to render it suitable for coating purposes. Prior to my invention, the general method of treating the oil has been to place a considerable quantity of it in a container and heat such batch to drive off a readily volatile portion and cause "bodying". Where these methods have been carried out in contact with air both in the case of tung oil and others such as linseed oil and the like, bodying may take the form of polymerization or oxidation. Without going into the detailed nature of these two processes, they are to be understood herein as meaning condensation of molecules without the addition of oxygen and condensation of molecules with the addition of oxygen respectively. It is my belief that in the polymerization of eleomargaric acid triglyceride which is the principal constituent of tung oil, polymerization involves condensation of the molecules without breaking down into simple ones while the oxidation thereof involves a splitting up of this large molecule into two or more simple ones which then condense with the addition of oxygen to form resin-like material.

It is an observed fact that polymerized tung oil has a remarkable tendency to absorb heat and in the case of a large batch of oil at a high temperature it may, and often does happen that a localized portion of the polymerized material will begin to absorb heat more rapidly than its immediate surroundings. This will cause polymerization to proceed more rapidly in that region and thus further intensify the tendency to overheating. The result is that such a temperature is reached as to volatilize with great rapidity a more volatile portion of the oil with the result that an explosion occurs. The larger the batch of oil being treated, the greater the danger from this cause. In the "pot boiling" methods of the past, this tendency to explosions has been combated by the addition of fresh oil at a lower temperature and is known as "knocking back".

I have discovered that the time and manner of heat treatment of this oil is of great importance. If the process can be carried out with such dispatch and at such low pressure that the volatile material is removed and the oil elevated to polymerizing temperature and returned to low temperature in the course of a few minutes, the resulting product is of superior quality and the viscosity can be controlled. In cases where the oil is heated in large quantities, and an attempt is made to reduce the time, the danger from explosions is enormously increased and the difficulty of effectively "knocking back" likewise. Adding to these difficulties, that of economically applying in a short time sufficient heat to accomplish the purpose, it is easy to see that a radical change from the prior art methods is necessary to effect rapid and safe heat treatment of this oil.

Many prior art processes have left the polymerizable constituent of the oil incompletely polymerized and relied upon the addition of large amounts of siccative material to give suitable drying qualities. Others have relied upon the addition of various resins to preserve the liquid condition of the treated oil. Both expedients detract from the quality of the product. I have found that if the heat treatment is carried out in the complete absence of oxygen and sufficiently rapidly at a low pressure, the volatile constituent of the oil can be driven off and removed and the polymerizable constituent completely polymerized and left in solution or suspension in an unpolymerizable non-volatile portion (about 8%) and that very little siccative (not more than $\tfrac{1}{10}$% of cobalt oleate) is required to give suitable drying qualities. I have found furthermore that no resinous material need be added to preserve the liquid condition and that by varying the time within rather narrow limits, the viscosity of the product can be controlled.

Accordingly, it is an object of my invention to provide a process for treating tung oil in such a way as to drive off and prevent reabsorption of the undesirable volatile constituent in a very short time while securing substantially complete polymerization of the eleomargaric acid triglyceride content and to produce by this method an oil of superior quality and controlled viscosity and all without the addition to the oil of any foreign material whatsoever.

A further object is to accomplish the above results by a continuous process, at the same time overcoming the difficulty of "knocking back" which is present when large quantities of the oil are treated in a batch or heated pressure tube and to complete the treatment of each particular portion of oil with hitherto unattainable rapidity.

In providing a process capable of achieving the above objects and an apparatus suitable for performing such process, I have encountered difficulties which will be apparent from the following description and it is to be understood that the solution of these problems, incident to the new process itself, is also an object of my invention.

Referring now to the drawings, Fig. 16 is a temperature-time diagram showing a sample condition obtained in practice and an ideal condition for extremely low viscosity of the product and Fig. 17 is a diagrammatic view bringing the essential structures into two dimensions and illustrating a modified form of apparatus for "knocking back".

Referring now to the accompanying drawings, the numeral 10 indicates a framework comprising suitably placed upstanding angle irons upon which the various structures are supported. Upon the upper end of the framework 10 is a heating device A affording an elongated passage through which oil may flow and in which the principal steps of the treatment are performed. Beneath the heating device A is a heat interchanger B through which passes fresh oil about to enter the heating device A and conditioned oil which has been discharged therefrom. Supported in any suitable manner at a level somewhat higher than the device A is a supply tank C from which oil flows to the interchanger B and to the "knock back" manifold 11. Between the supply tank C and the interchanger B is a preheater D which is automatically regulated by the regulator E responsive to a thermostat 12 in the outlet from the interchanger, that is, between the same and the heating device A. The conditioned oil outlet from the interchanger B may communicate with a cooling coil 13 in a cooling device F. The foregoing generally described devices control the flow and temperature of the oil as it passes through the device.

Figures 12, 13, 15:
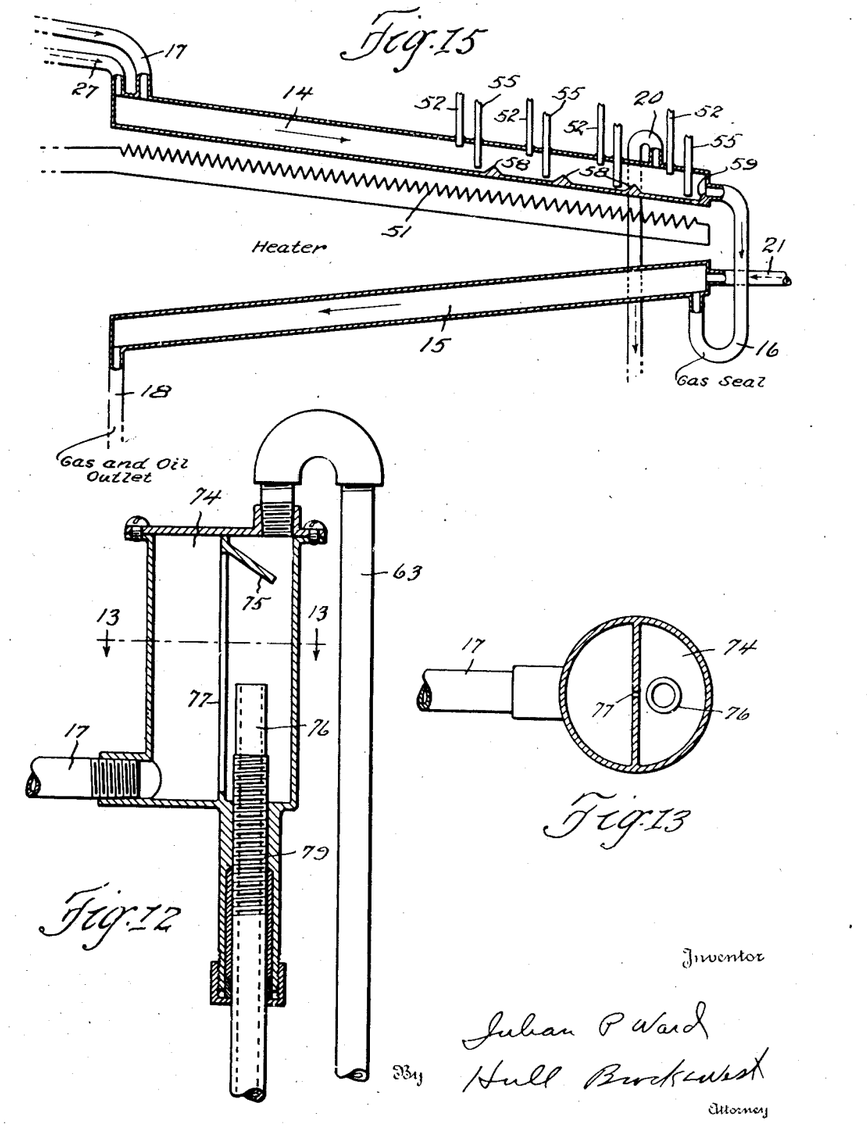
Fig. 12 is a fragmentary sectional view showing an overflow fixture in the oil feed line.
Fig. 13 is a section on the line 13—13 of Fig. 12.
Fig. 15 is a simplified diagrammatic view illustrating the principle of the spiral oil passages in two dimensions.
Figure 14:
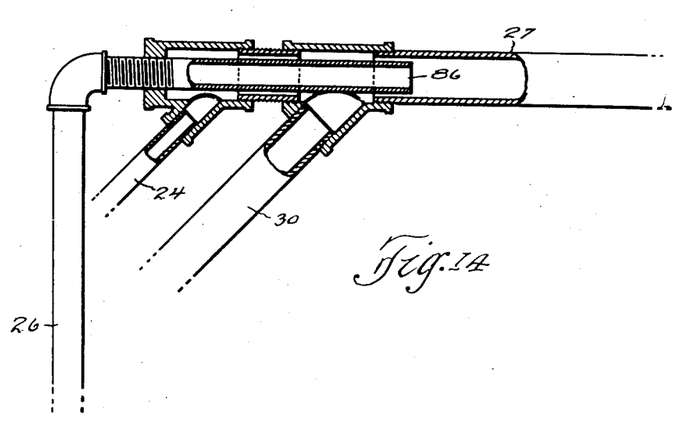
Fig. 14 is a detail sectional view showing the injector steam inlet in its relation to the inlets for fresh and recirculated nitrogen.

In the device A, as will be most clearly seen by reference to the schematic showing in Fig. 15, there are upper and lower chambers 14 and 15 connected by pipe 16 having a depending trap portion which in the operation of the device will be filled with oil whereby to prevent the passage of gases from one to the other. The upper chamber has an inlet 17 for fresh oil while the lower chamber has an outlet 18 for conditioned oil. The upper chamber has an inlet 27 for a gas, an atmosphere of which is to be maintained over the oil in the chamber 14 and an outlet 20 through which such gas escapes. It will be understood that these outlet and inlet means may be reversed. The lower chamber 15 has an inlet 21 for a gas, an atmosphere of which is to be maintained in that chamber and which may escape through the oil outlet 18 to the upper end of the heat interchanger from which it may be drawn off through a pipe 22.

The gaseous atmosphere maintained in the upper chamber consists of a mixture of nitrogen and oxygen free steam. Nitrogen from any suitable source is introduced through a supply pipe 23 which communicates through a branch pipe 24 with the upper chamber and through a branch pipe 25 with the lower chamber. A device G for generating air free steam communicates through a pipe 26 with a larger pipe 27 in communication with the upper chamber 14. As the mixture of steam and nitrogen passes through the chamber 14 and is drawn off through the outlet 20, it is passed through a suitable washing fluid in a tank 28 and forced by means of a pipe 29 through a pipe 30 back into the inlet pipe 27. A constant and controllable pressure may be maintained by means of the branch tube 31 dipping into a receptacle 32 containing liquid to any desired height thereby preventing any excess pressure which would tend to cause reabsorption. I prefer to operate at about atmospheric pressure and consider that if such pressure is exceeded by more than about twenty-five pounds per square inch, the product will be damaged by reabsorption. The gas which I prefer to employ in the lower chamber is dry nitrogen and this may be recirculated in a similar manner by being drawn through the pipe 22 by the pump 32ª and passed through a condenser 33 which removes moisture and allows it to drain into a trap 34. From the condenser, the nitrogen passes through a pipe 35 and returns to the lower chamber 15. While the pressure in the lower chamber is not critical, it will in the present machine be substantially the same as in the upper chamber.

By reference to Figs. 5 to 8 inclusive, the construction of the heating device A will become apparent. The upper chamber 14 will be seen to comprise a pair of spaced disk-like top and bottom walls 36 and 37 joined by a cylindrical wall 38 and forming, with the exception of inlet and outlet means a gas-tight compartment. The bottom wall 37 may be conical or upwardly convex, as clearly seen in Fig. 6 and provided with a spiral rib 39 defining an elongated spiral path through which oil entering by the inlet 17 may flow outwardly and downwardly to pass into the pipe 16 through the trap at the lower end thereof and into the lower chamber 15. Said lower chamber 15 is of similar construction except that the inner convolutions of the spiral 40 thereof are lower than the outer ones. The compartment 15 has similar spaced top and bottom walls 41 and 42 and an outer cylindrical wall 43. The wall 36 may have a depending flange 44 extending downwardly and enclosing the space between the upper and lower units of the heating device A. These units may be connected together by one or more brackets 45 extending therebetween. Mounted upon the top wall 41 of the lower unit are brackets 46 supporting an annular angle iron member 47 and a smaller similar member 48 upon which annular members are supported radially extending elongated supporting members 49. Each supporting member 49 carries an electric heating unit 50 which may consist of a suitable refractory element having resistance wire 51 wound thereon. It will be noted that the heating elements are positioned in close proximity to the bottom wall of the upper unit whereby oil in the chamber 14 is heated rapidly. This is desirable since the temperature of the oil is elevated in the upper chamber while it is merely maintained at an elevated temperature during its passage through the lower chamber. This will be evident from the temperature-time chart shown in Fig. 16.

Figure 5:
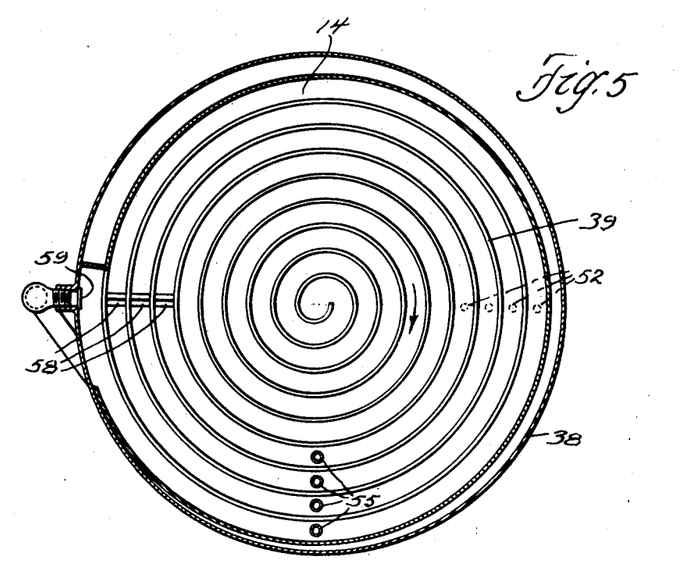
Fig. 5 is a plan view of a spiral unit through which oil is adapted to flow while being heated.
Figure 6:
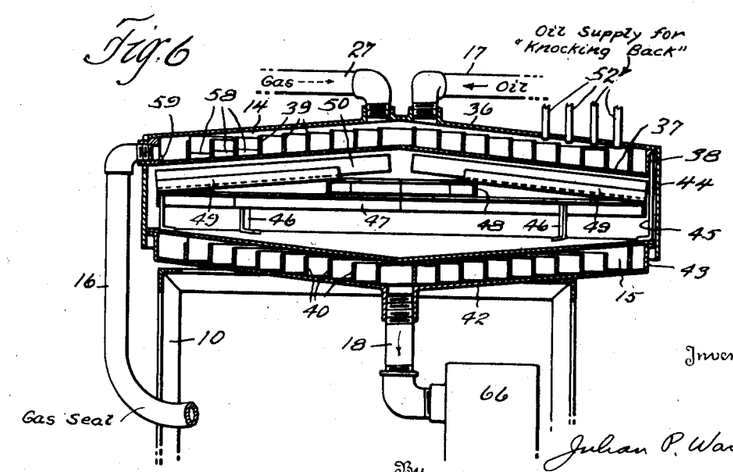
Fig. 6 is a sectional view taken through the double spiral heating device, one unit of which is shown in plan in Fig. 5.

Extending through the wall 36 of the upper chamber 14 are a plurality of oil inlets 52 which permit the admission into the lower convolutions of the spiral path of additional quantities of oil at a lower temperature for the purpose of "knocking back". As will be seen by reference to Fig. 1, these inlets 52 are bent to form a trap whereby to prevent ingress of air and terminate at their upper ends in a funnel 53 which is positioned directly under one of the outlets 54 from the "knock back" manifold 11. Positioned 90° in advance of the members 52 are corresponding thermometers 55 which may be supplanted by thermostat bulbs 55a as indicated in Fig. 17. If such bulbs are employed, there will be provided means 56 responsive thereto for controlling valves 57 which control the passage of oil through the outlets 54. Where thermometers 55 are employed as indicated in Fig. 5, manual operation of the valves 57 will be necessary. Extending across the space between the lower convolutions of the spiral ribs 39 are baffles or dams 58 for a purpose hereinafter described. A dam 59 is provided at the outlet into the pipe 16 and serves a purpose similar to those 58.

Figures 9, 10, 11:
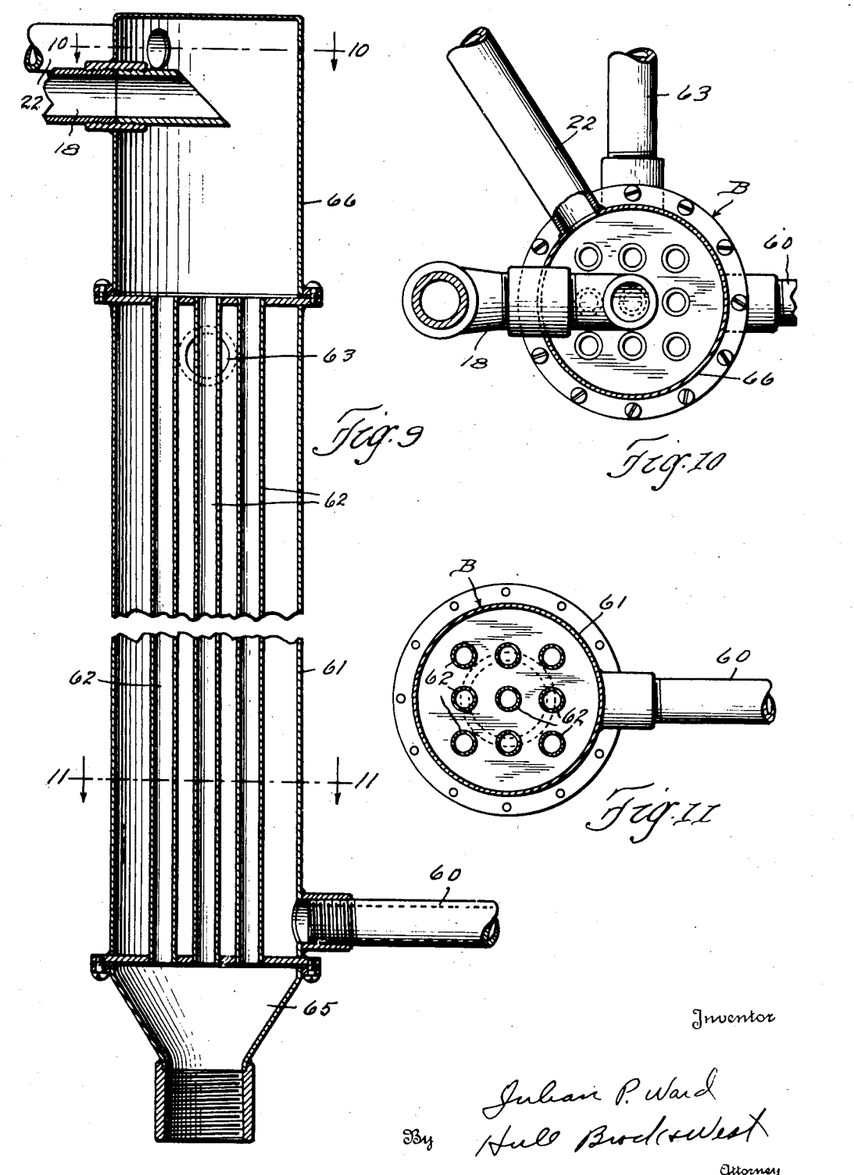
Fig. 9 is a longitudinal sectional view taken through a heat exchange unit.
Fig. 10 is a section on the line 10—10 of Fig. 9.
Fig. 11 is a section on the line 11—11 of Fig. 9.
Figure 11:
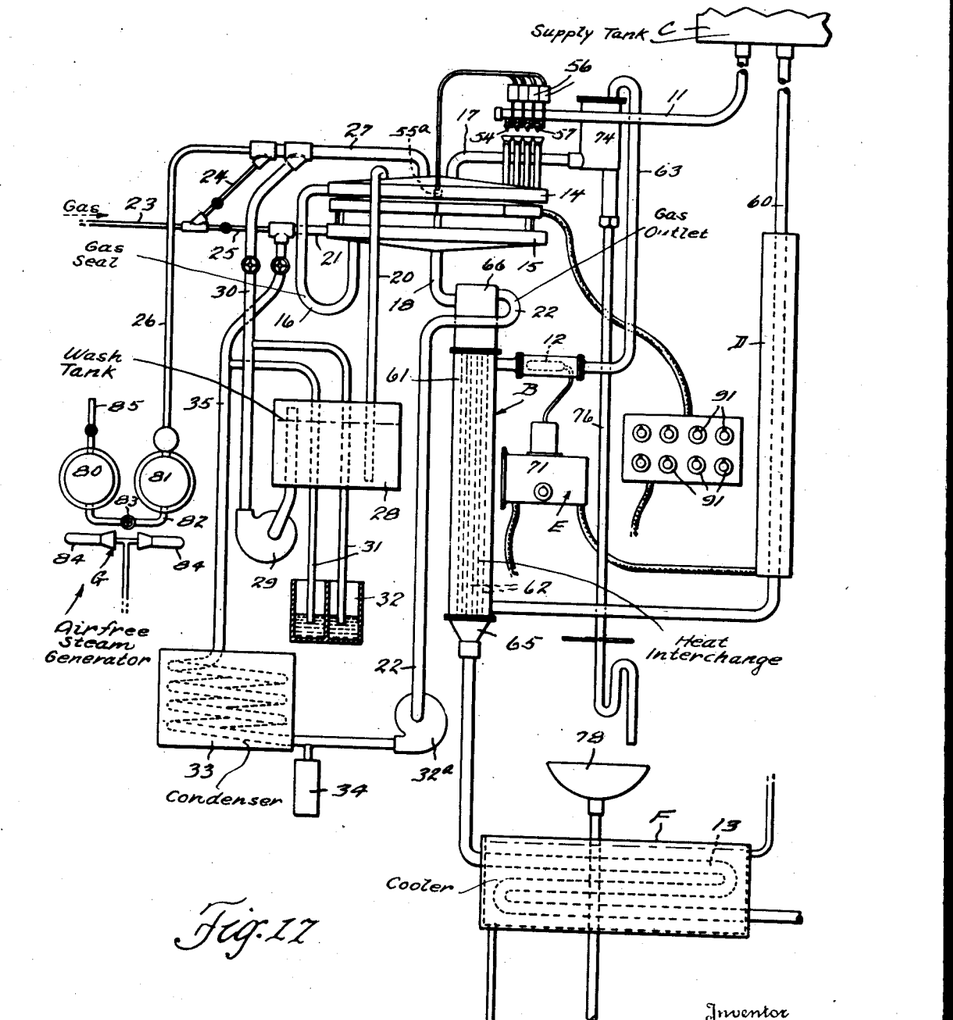

By reference to Figs. 9 to 11, the construction of the heat interchanger B will be obvious. Fresh oil enters through the pipe 60 and fills the space between the outer wall 61 and the tubes 62 and passes outwardly through the pipe 63. Conditioned oil enters the upper end through the pipe 64 and passes through the tubes 62 into the header 65. In addition to the pipe 18 through which oil enters the header 66 there is a pipe 22 through which gas entering with the conditioned oil through the pipe 64 is drawn off.

Figure 1:
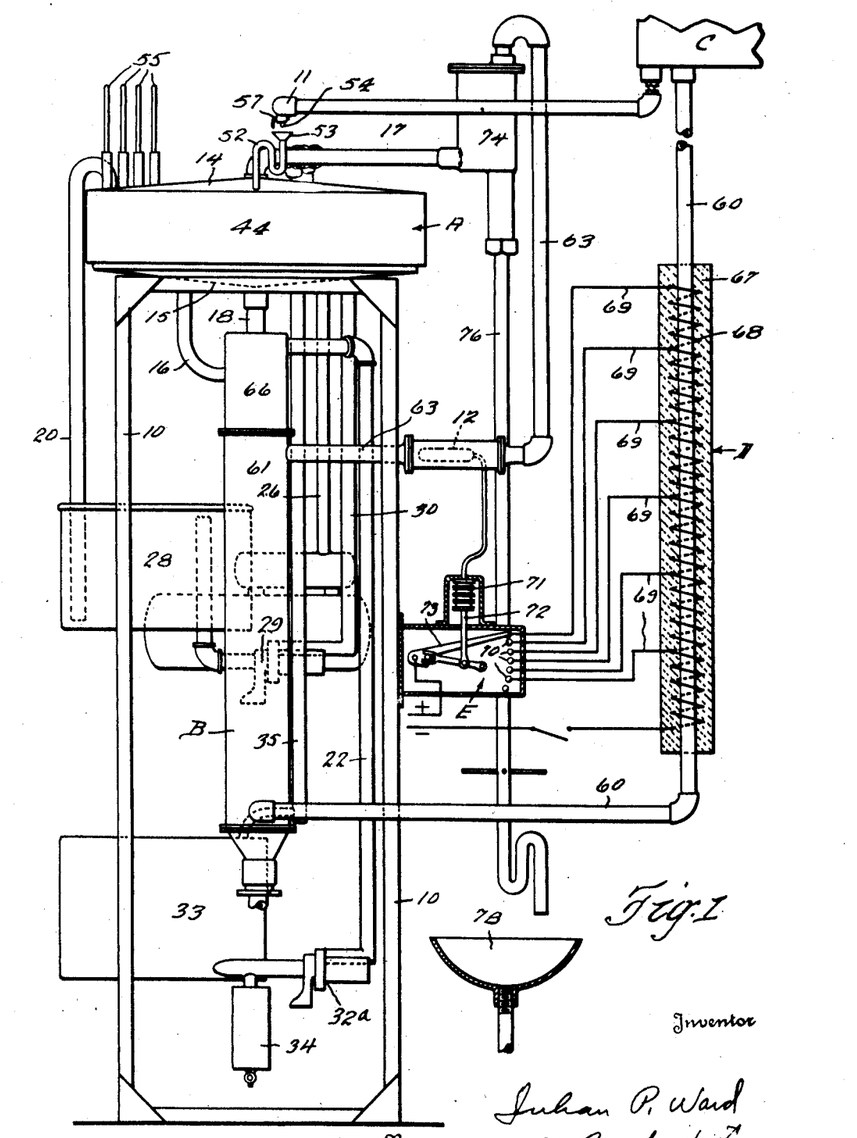
Fig. 1 is a side elevation of an apparatus for carrying out my improved process.
Figure 2:
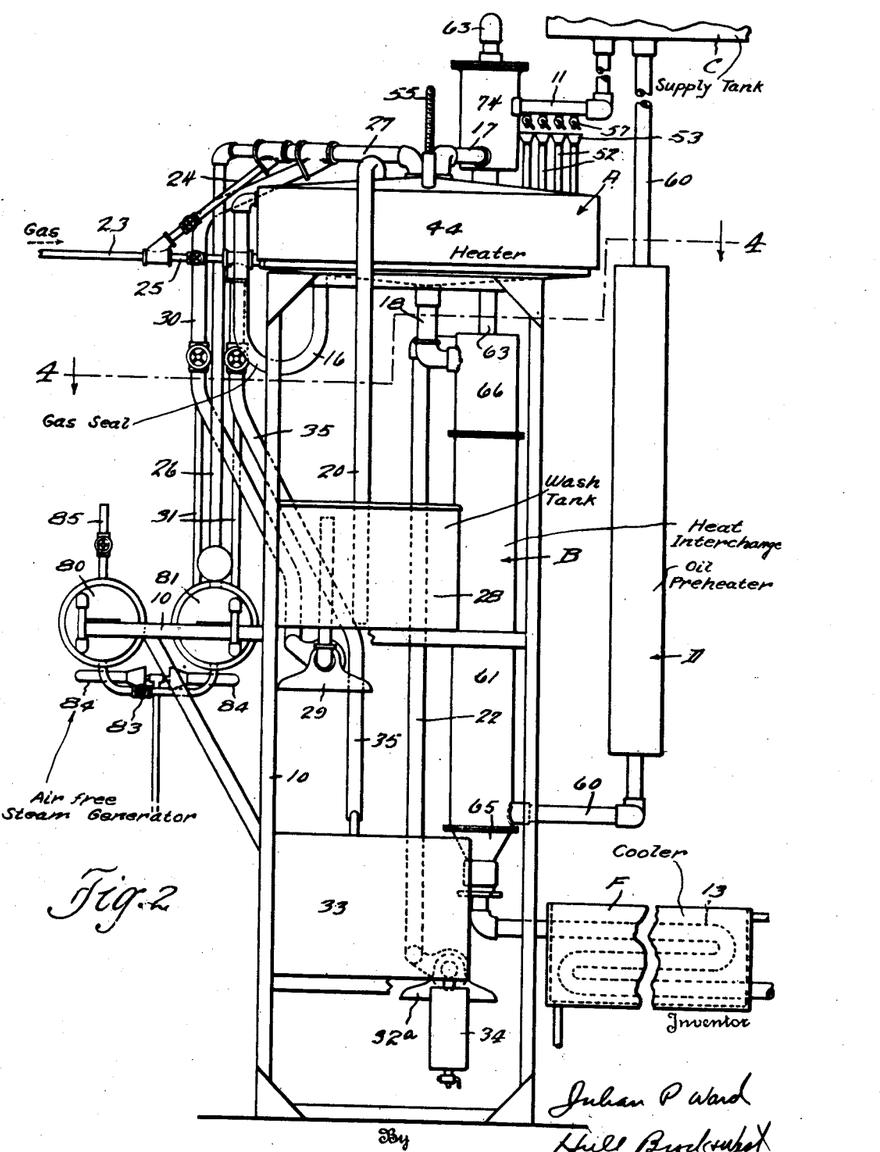
Fig. 2 is an elevational view at right angles to Fig. 1.
Figure 3:
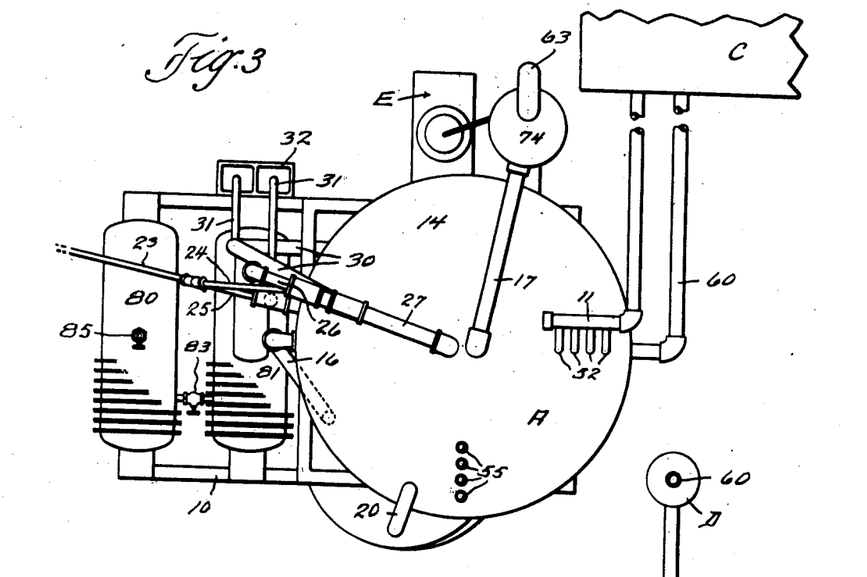
Fig. 3 is a top plan view.
Figure 4:
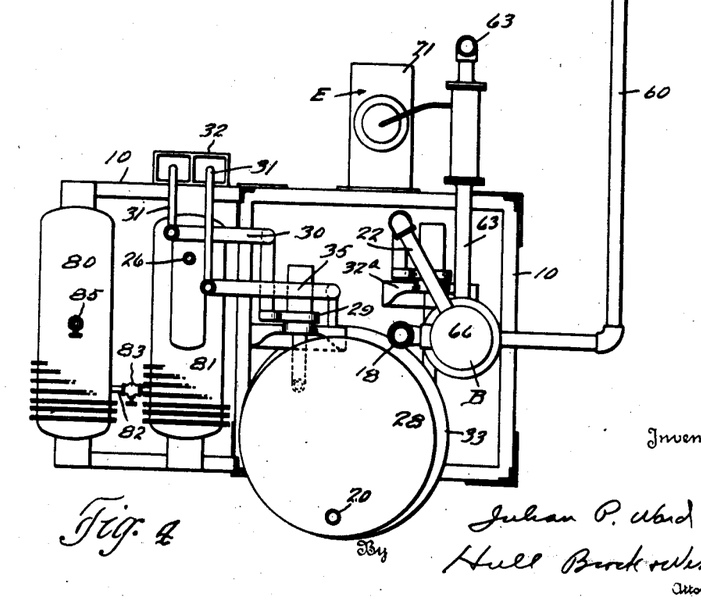
Fig. 4 is a sectional view corresponding substantially to the line 4—4 of Fig. 2.

By reference to Fig. 1 the construction of the preheater D and its control E will become apparent. The vertical portion of the pipe 60 is surrounded by a suitable heating element comprising a refractory body 67 in which is embedded a suitable resistance element 68 from which a plurality of taps 69 are taken off and led to contact elements 70 in the control box 71. The bulb 12 of a thermostatic device is positioned in the pipe 63 and operates an expansible chamber 71 which is connected with a rod 72 which controls an arm 73 through a suitable system of compounding levers for the purpose of cutting in and out of circuit various parts of resistance element 68 by its movement from one to the other of the contacts 70. One side of a suitable source of electric current is connected with the arm 73 while the other side is connected with the lower end of the resistance element 68. It will be obvious that when the temperature of the oil in the pipe 63 goes above a predetermined point, one or more sections of the heating element 68 will be cut out and that when it goes below such predetermined point, one or more will be cut in whereby the temperature of the oil supplied to the heating element A will be substantially constant.

By reference to Fig. 12, the details of the oil feeding system will be seen. Oil enters through the pipe 63 to the top of a chamber 74 and discharges against a baffle 75 from whence it drops to the bottom and fills such chamber up to a point not higher than the top of the pipe 76 and passes through a narrow slit 77 into the left hand side of the chamber. As the oil rises to a point above the upper end of the pipe 76, it overflows therethrough and is discharged into a funnel 78 which communicates with any suitable container from which the oil may be elevated to the tank C. From the chamber 74 the oil passes through the pipe 17. The overflow pipe 76 may be screw threaded as indicated at 79 whereby it is raised or lowered according to the height desired. The narrow passage 77 prevents rapid passage of oil from the right to the left hand side of the chamber 74 and when taken in connection with the overflow pipe 76 renders constant the rate of passage of oil into the treating chamber irrespective of the height of oil in the tank C.

The air free steam generator G consists of two boilers 80 and 81 connected together by a pipe 82 the passage of water through which is controlled by a valve 83. These boilers may be heated by any suitable means, such as gas burners 84. The boiler 80 has a water inlet 85 and a steam outlet to the pipe 26. In generating steam, the boiler 80 is filled with water and heated until 20% is boiled away, whereby all dissolved air is removed. This air free water is then admitted to the boiler 81 and converted into steam. A portion of the steam may be allowed to escape and carry with it any air contained above the water in the boiler 81. Steam from the boiler 81 passes upwardly through the pipe 26 and is admitted to the pipe 27 through an injector nozzle 86 beyond the inlet of the nitrogen supply and beyond the recirculation pipe 30.

Figure 7:
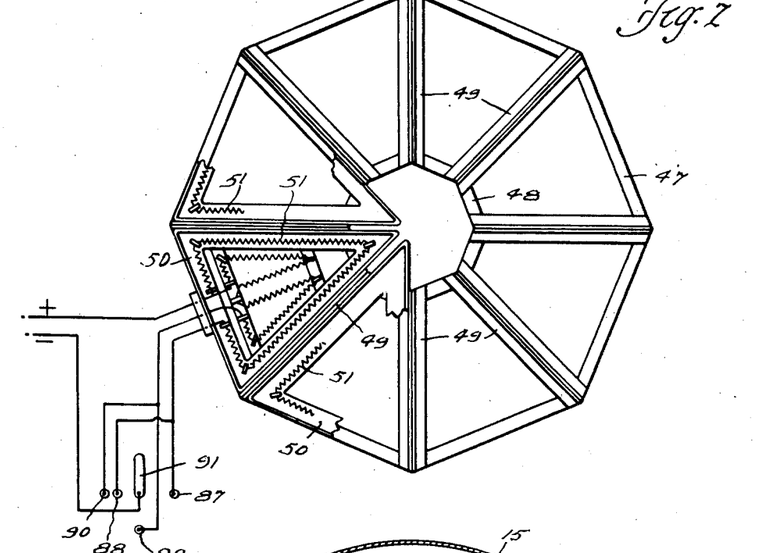
Fig. 7 is a semi-diagrammatic view of the electric heating element employed in connection with the spaced spirals of Fig. 6.
Figure 8:
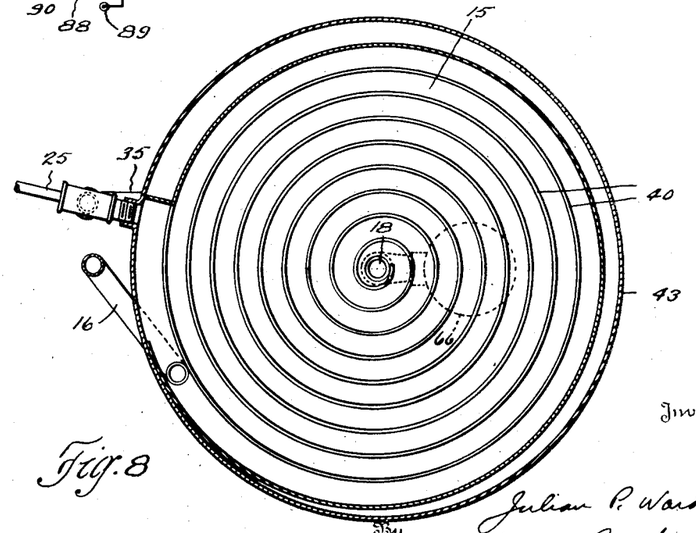
Fig. 8 is a plan view of the lowermost spiral shown in Fig. 6.

The heaters carried by the refractory elements 50 may be divided into two parts, an end of both of which is connected with one side of a suitable source of current while the other end of each is connected to a contact which may be connected through a movable switch with the other side of the line. Also two adjacent contacts may be provided whereby said switch can connect both portions in parallel. Referring to Fig. 7, the two sections of the heating element 51 are shown connected to the positive side of a line while the other end of the outermost element is connected with a contact 87 and with a contact 88 while the other end of the innermost portion is connected with contacts 89 and 90. Contacts 88 and 90 are positioned close together so that the movable element 91 of the switch may contact both at the same time.

It will be understood that in each sector of the heating element, the same connections are made. This gives three possible connections for each one and since they are connected independently through switches 91 to a current source, still further variations may be had.

*Operation*

The passage of oil through the device, the preheating of the oil by the heating element D and the transfer of heat from treated oil to the fresh oil in the heat interchanger B as well as the circulation and supply of the non-oxidizing gases for the chambers 14 and 15 have already been indicated and need not be elaborated.

Figure 16:
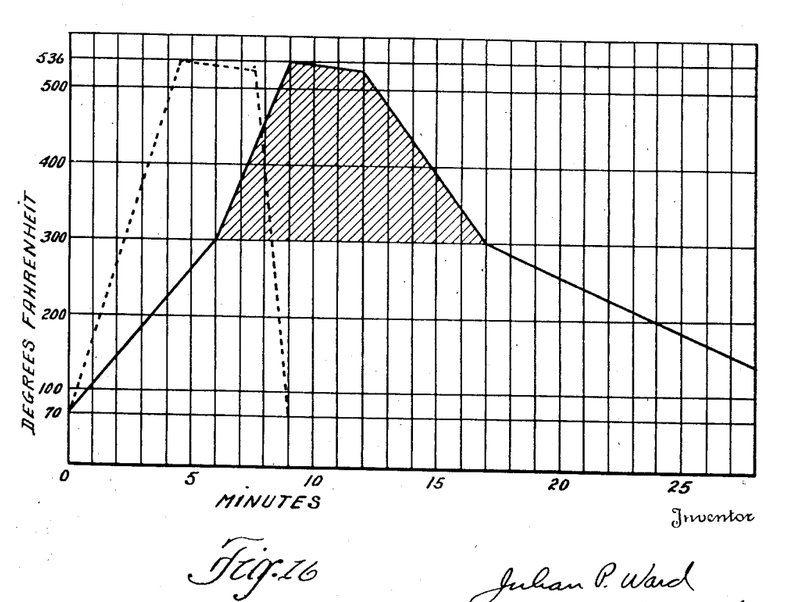

When oil passes through the spiral channel in the upper heating unit in close juxtaposition to the heating elements, it flows in a relatively thin stream and is in contact with metal surfaces, as well as constantly circulating atmosphere. These factors tend to produce uniform temperature of closely adjacent parts of the oil in any particular region while allowing a gradual increase of temperature from the point at which the oil enters to the point of discharge into the pipe 16. Thus the danger of explosion even in the absence of means for knocking back is greatly reduced. Also in view of the fact that the spiral ribs do not reach to the top of the chamber, there is provided a considerable space into which gases could expand if any small scale explosion, such as might possibly occur in this device, should take place. Furthermore, by the use of a small continuously moving stream of oil, it is possible to apply heat sufficiently rapidly to elevate the temperature, drive off the undesirable volatile matter, produce polymerization and cooling, all within the space of a few minutes. As indicated in Fig. 16, it is desirable that the temperature should be elevated from about 300° F. to about 536° F. and returned within the space of approximately eleven minutes. Even more rapid operation is desirable if a low viscosity product is desired. It is to be understood that the temperature and time indicated are not sharply critical, although they are greatly smaller than in prior art practice, and considerable variation is allowable. The time-temperature relations shown in Fig. 16 are given by way of example and are very satisfactory. However, it is not my desire to be limited in this respect.

In flowing tung oil in a thin stream while it is being heated, a phenomena is encountered which I call "stripping". That is, certain portions of the oil in certain temperature regions tend to become more viscous than adjacent portions and flow more slowly whereby the least viscous parts run away and allow such slow moving liquid to become overheated and still more viscous. In order to prevent any harmful results from this tendency, I have introduced the dams 58 and 59 which cause the oil in those regions where there is a danger of stripping to flow slowly and provide for equalization of temperature in various adjacent portions and for equal viscosity, thus assuring even flow and even conditioning. It will be noted that the oil inlets 52 are positioned 90° from the thermometers 55 whereby to allow an interval of time for admitting the oil. In case the automatic control is employed, the distance between the thermostatic bulb and the inlet tubes may be reduced since the time interval required for operation of the valve in response to the thermostat will be small.

By reference to the full line curve in Fig. 16, it will be seen that the oil is elevated from room temperature to about 300° at a little slower rate than from 300° to 536°. This portion of the curve corresponds to the heating which takes place in the preheater D and heat exchanger B. By reason of the automatic control E for the preheater D, the temperature of the oil passing from the interchanger to the heating device A will be substantially constant as indicated in the diagram. The elevation of the oil from 300° to 536° takes place in the upper unit of the heating device A and proceeds rather more rapidly than the heating prior to admission to the device A. Somewhere in the temperature region between 300° and 536°, depending upon the particular sample of oil being heated, the evolution of the undesirable volatile material begins. This temperature is known as the gas point. As the temperature is elevated, gassing continues and under the conditions existing in this device, is substantially complete before the latter temperature is reached. By the use of a constantly renewed atmosphere of non-oxidizing gas in the upper chamber 14, the volatile material is carried away and its removal from the oil speeded up. Gassing is also promoted by the presence of steam with the nitrogen as compared with the use of dry nitrogen. Inasmuch as it is highly desirable to carry out the complete operation in a relatively short time, the addition of steam through the nitrogen in the upper chamber is quite advantageous.

Following the passage of the oil from the upper chamber 14 to the lower chamber 15, it flows along the lower spiral in contact with an atmosphere of dry nitrogen in substantially the same length of time required to flow through the upper chamber and during this period, due to the greater distance from the heating element, the temperature is not increased but remains substantially constant. It may even fall slightly as indicated in Fig. 16 between 9 and 12 minutes. During the passage through the lower chamber, the oil is freed from water which it may have acquired by contact with the steam in the upper chamber.

The oil is then discharged into the heat exchanger B where it yields a portion of its heat to the incoming fresh oil and then passes to the cooling device F where it is brought down to the neighborhood of room temperature.

It is desirable that the oil be taken from room temperature through the entire process and back to room temperature in a short time. However, the most critical range is that shaded in Fig. 16 and in this region the reaction must be carried out rapidly to secure best results. For temperatures below the gas point of the oil greater time may be allowed and speed is of less importance. It is not essential that the oil be delivered to the heating element A at exactly 300° but it should be so delivered at a temperature just below the gas point and should be cooled again below the gas point before being discharged from the lower chamber. The upper temperature limit is likewise not sharply critical, but must be so regulated that the oil does not set to a jelly-like mass or become too viscous for practical purposes. It must also be high enough that the polymerizable portion is completely polymerized.

From the foregoing, it will be obvious that I have provided an improved process for treatment of tung oil as well as an apparatus well adapted for carrying out the process and that the result is a superior product which can be made more economically and uniformly than heretofore. I therefore do not wish to be limited to the details of the disclosure but only in accordance with the spirit and scope of the appended claims.

Having thus described my invention, what I claim is:

1. In a device for bodying tung oil or the like, walls defining upper and lower compartments, means defining an oil treating channel in each of said compartments terminating short of the top of such compartment, means for supplying oil continuously to the upper channel, the lower channel being of a size similar to the upper, conduit means connecting said channels for passage of liquid only from the upper to the lower thereof, means for maintaining and renewing an atmosphere of gas above the oil in each of said channels; and means for maintaining progressively higher temperatures in succeeding portions of said upper channel and a substantially constant temperature in said lower channel.

2. In a device for bodying tung oil or the like, walls defining upper and lower compartments, means defining an oil treating channel in each of said compartments terminating short of the top of such compartment, means for supplying oil continuously to the upper channel, the lower channel being of a size similar to the upper, conduit means connecting said channels for passage of liquid only from the upper to the lower thereof, means for maintaining and renewing an atmosphere of gas above the oil in each of said channels, and means for maintaining progressively higher temperatures in succeeding portions of said upper channel and a substantially constant temperature in said lower channel, said last means including mechanism for supplying oil at a lower temperature to said upper channel at a selected one of a plurality of points near the delivery end of said upper channel.

3. In a device for bodying tung oil or the like, walls defining upper and lower compartments, means defining an oil treating channel in each of said compartments terminating short of the top of such compartment, means for supplying oil continuously to the upper channel, the lower channel being of a size similar to the upper, conduit means connecting said channels for passage of liquid only from the upper to the lower thereof, means for maintaining and renewing an atmosphere of gas above the oil in each of said channels, and means for maintaining progressively higher temperatures in succeeding portions of said upper channel and a substantially constant temperature in said lower channel, said last means including mechanism for automatically supplying oil at a lower temperature to said upper channel at any one or more of a plurality of points along said upper channel responsive to an abnormal increase in temperature adjacent such point or points.

4. In a device for bodying tung oil or the like, walls defining upper and lower compartments, means defining an oil treating channel in each of said compartments terminating short of the top of such compartment, means for supplying oil continuously to the upper channel, the lower channel being of a size similar to the upper, conduit means connecting said channels for passage of liquid only from the upper to the lower thereof, means for maintaining and renewing an atmosphere of moist, non-oxidizing gas above said upper channel, means for maintaining and renewing an atmosphere of dry, non-oxidizing gas over the lower channel, and means for maintaining progressively higher temperatures in succeeding portions of said upper channel and a substantially constant temperature in said lower channel.

5. In a device for bodying tung oil or the like, walls defining upper and lower compartments, means defining an oil treating channel in each of said compartments terminating short of the top of such compartment, means for supplying oil continuously to the upper channel, the lower channel being of a size similar to the upper, conduit means connecting said channels for passage of liquid only from the upper to the lower thereof, means for maintaining and renewing an atmosphere of gas above the oil in each of said channels, and means for maintaining progressively higher temperatures in succeeding portions of said upper channel and a substantially constant temperature in said lower channel, said last means including mechanism for automatically supplying oil at a lower temperature to said upper channel at any one or more of a plurality of points along said upper channel responsive to an abnormal increase in temperature a short distance in advance of such point or points.

6. In a device of the class described, a pair of closed chambers, one being placed above the other in spaced relation thereto, heating means disposed between said chambers, each of said chambers having therein a spiral rib of a height less than that of the chamber and defining with walls of said chamber a spiral channel having one end higher than the other, means for supplying oil to be heated to the upper end of the upper channel, means for conducting liquid only from the lower end of said upper channel to the upper end of said lower channel, means for conducting oil from the lower end of the lower channel, and means for maintaining atmospheres of different character above said upper and lower channels.

7. In a device of the class described, a pair of closed chambers, one being placed above the other in spaced relation thereto, heating means disposed between said chambers, each of said chambers having therein a spiral rib of a height less than that of the chamber and defining with walls of said chamber a spiral channel having one end higher than the other, means for supplying oil to be heated to the upper end of the upper channel, means for conducting liquid only from the lower end of said upper channel to the upper end of said lower channel, means for conducting oil from the lower end of the lower channel, and means for maintaining and continuously renewing atmospheres of different character above said upper and lower channels.

8. In a device of the class described, a pair of closed chambers, one being placed above the other in spaced relation thereto, heating means disposed between said chambers, each of said chambers having therein a spiral rib of a height less than that of the chamber and defining with walls of said chamber a spiral channel having one end higher than the other, means for supplying oil to be heated to the upper end of the upper channel, means for conducting liquid only from the lower end of said upper channel to the upper end of said lower channel, means for conducting oil from the lower end of the lower channel, and means for maintaining atmospheres of different character above said upper and lower channels, said heating means being positioned to supply heat substantially equally to all parts of said upper channel while supplying heat to said lower channel in substantially decreasing amount toward the lower end thereof.

9. In a device of the class described, closed chambers positioned one above the other, the bottom of the upper chamber being upwardly concave, the bottom of the lower chamber being downwardly concave, spiral ribs of less height than said chambers on the bottoms of each thereof defining oil channels, means for introducing oil to be treated centrally of the upper spiral channel, means for removing it centrally of the lower channel, means for conducting liquid only from the periphery of the upper channel to the periphery of the lower channel, means for maintaining and renewing separate atmospheres above said channels, and electric heating means adapted to supply heat to both said chambers and positioned substantially parallel to the bottom of the upper chamber.

JULIAN P. WARD.